United States Patent [19]

Ozaki et al.

[11] 4,364,096
[45] Dec. 14, 1982

[54] APPARATUS FOR REPRODUCING PCM MAGNETIC RECORDING TAPE

[75] Inventors: Minoru Ozaki; Ken Onishi, both of Amagasaki, Japan

[73] Assignee: Mitsubishi Denki Kabushiki Kaisha, Tokyo, Japan

[21] Appl. No.: 168,553

[22] Filed: Jul. 14, 1980

Related U.S. Application Data

[63] Continuation of Ser. No. 35,404, May 2, 1979.

[51] Int. Cl.³ .................... G11B 27/02; G11B 5/00
[52] U.S. Cl. ................................. 360/13; 360/32
[58] Field of Search ................ 360/13, 38, 32, 40

[56] References Cited

U.S. PATENT DOCUMENTS

| | | | |
|---|---|---|---|
| 3,190,969 | 6/1965 | Mattis | 360/13 |
| 3,683,164 | 8/1972 | Minami | 360/13 |
| 4,163,261 | 7/1979 | Ito | 360/13 |

OTHER PUBLICATIONS

"Pulse-Code-Modulation Recording System", Iwamura et al., J. Audio Eng'r Soc. 9/73, vol. 21 #7.

*Primary Examiner*—Vincent P. Canney
*Attorney, Agent, or Firm*—Oblon, Fisher, Spivak, McClelland & Maier

[57] ABSTRACT

An apparatus for reproducing voice signals from a PCM magnetic recording tape which is equipped with a discontinue waveform calibrator which comprises a control signal generator for detecting an edited part from PCM signal rows reproduced from the magnetic tape and for transmitting a control signal; a first memorizing means for memorizing at least one word part of the PCM signal rows which are sequentially imputted; a second memorizing means for memorizing specific words of the PCM signal rows overflowed from the first memorizing means; a third memorizing means for memorizing at least one word part of the PCM signal rows overflowed from the memorizing means; a first weighing means for multiplying a gradually increasing weight from X0 to X1 to the memorized data of the first memorizing means upon receiving the control signal to output it; a second weighing means for multiplying a gradually decreasing weight from X1 to X0 to the memorized data of the third memorizing means upon receiving the control signal; an adder for summing gradually output signals of the first and second weighing means; and a switch for switching to receive as an input the PCM signal overflowed from the third memorizing means in the normal state and switching the PCM signal output from the adder into the decoder upon receiving the control signal.

6 Claims, 16 Drawing Figures

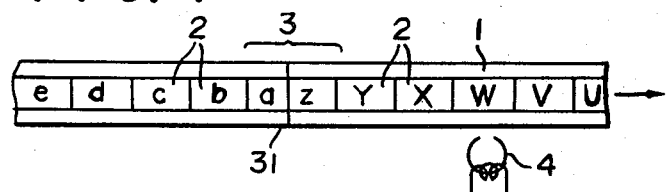
FIG. 1
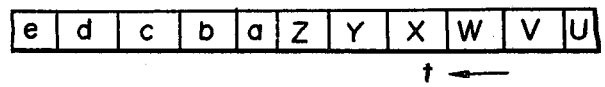
FIG. 2
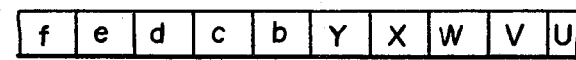
FIG. 3(a)
FIG. 3(b)
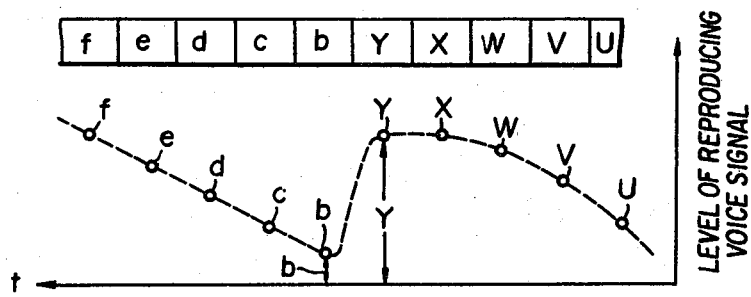
FIG. 4
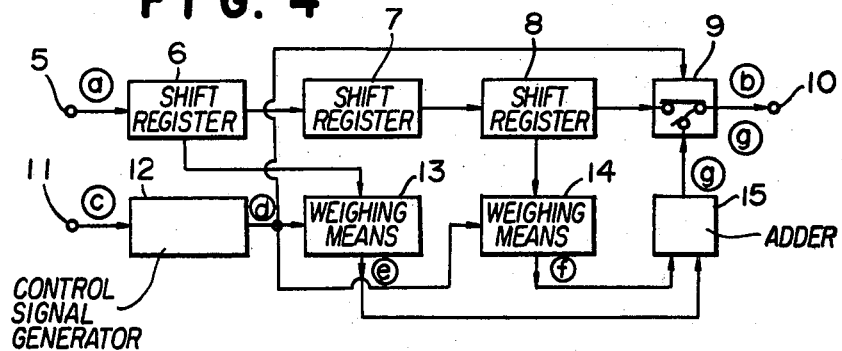
FIG. 7
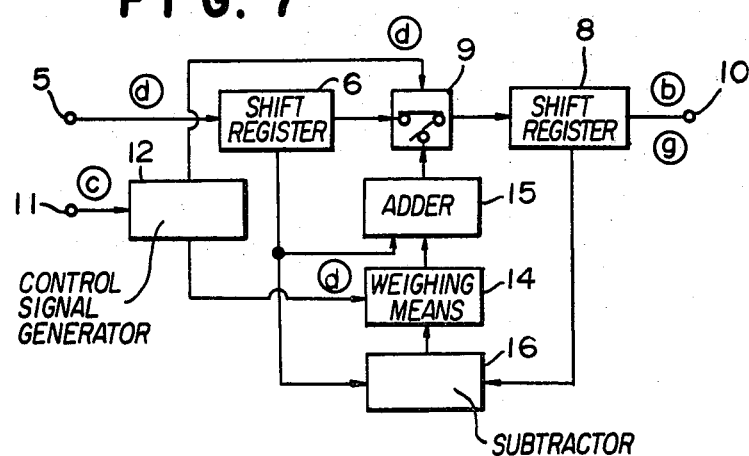

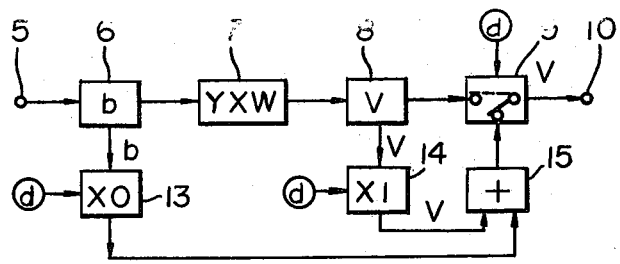
FIG. 5(a)
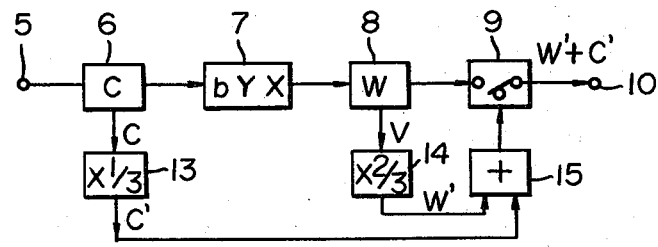
FIG. 5(b)
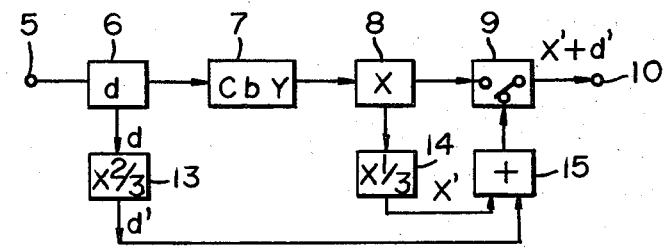
FIG. 5(c)
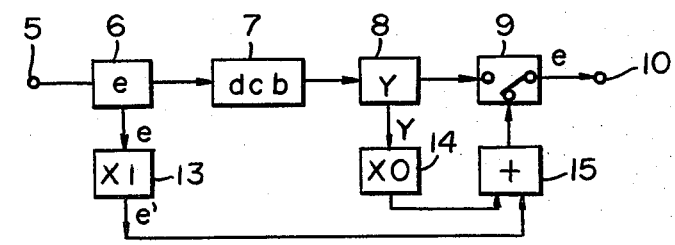
FIG. 5(d)
FIG. 6
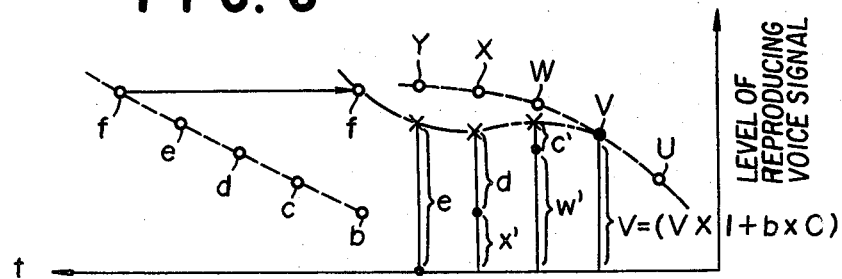

APPARATUS FOR REPRODUCING PCM MAGNETIC RECORDING TAPE

This is a continuation of application Ser. No. 035,404 filed May 2, 1979.

BACKGROUND OF THE INVENTION

1. Field of the Invention

The present invention relates to an apparatus for reproducing a coded voice signal (hereinafter referring to PCM signal). More particularly, it relates to a reproducing apparatus equipped with a calibrator for calibrating sudden level variation of reproduced sound caused at a connected part when a tape in which PCM signal is magnetically recorded, is compiled.

2. Description of the Prior Art

Apparatuses for recording and reproducing a PCM signal and for converting a voice signal to PCM signal so as to record it on magnetic recording tape, have been practically used.

FIG. 1 shows the recording pattern of these magnetic tapes wherein the reference numeral (1) designates a magnetic tape; (2a), (2b) . . . (2z) respectively designate recording parts in which each one word PCM signal is recorded; (3) designates an edited part; (4) designates a reproducing head; (31) designates a connected part of the magnetic tape (1). The magnetic tape (1) is driven in the arrow line direction to the magnetic head (4) and the PCM signal row as shown in FIG. 2 is detected by the magnetic head (4). The PCM signal row is decoded as the signal row (2) shown in FIG. 3(a) and the parts a and z in the edited part (3) are eliminated thereby reproducing it as the voice signal shown by the broken line in FIG. 3(b).

However, when the reproduction is carried out by eliminating the edited part (3) in which codes are lost, it is usual to cause a large level difference between Y and b as shown in FIG. 3(b) to give abnormal sound, disadvantageously.

When the conventional magnetic tape in which the analogue signal is recorded, is edited, the level difference in front of and in back of the connected part of the magnetic tape is gradually calibrated by cutting the magnetic tape in slant and bonding them. However, the magnetic tape in which a PCM signal is recorded, can not be easily calibrated in such a simple manner. The level difference caused in the connected part should be calibrated by an electrical method. Thus, reproducing apparatus having such calibrating function has not been obtained.

SUMMARY OF THE INVENTION

It is an object of the present invention to provide a reproducing apparatus having said calibrating function, wherein the sudden change of level difference is prevented by weighing and summing PCM signal rows in front of and in back of the edited part.

The foregoing and other objects of the present invention have been attained by providing an apparatus for reproducing voice signals from a PCM magnetic recording tape (magnetic tape in which codified voice signal is recorded) which is equipped with a discontinue waveform calibrator which comprises a control signal generator for detecting a edited part from PCM signal rows reproduced from the magnetic tape to transmit a control signal; a first memorizing means for memorizing at least one word part of the PCM signal rows which are sequentially input; a second memorizing means for memorizing specific words of the PCM signal rows overflowed from the first memorizing means; a third memorizing means for memorizing at least one word part of the PCM signal rows overflowed from the memorizing means; a first weighing means for multiplying a gradually increasing weight from X0 to X1 to the memorized data of the first memorizing means upon receiving the control signal to output it; a second weighing means for multiplying a gradually decreasing weight from X1 to X0 to the memorized data of the third memorizing means upon receiving the control signal; an adder for summing gradually output signals of the first and second weighing means; and a switch for switching to input the PCM signal overflowed from the third memorizing means in the normal state and switching the PCM signal output from the adder into the decoder upon receiving the control signal.

BRIEF DESCRIPTION OF THE DRAWINGS

FIG. 1 shows a magnetic tape in which a PCM signal is recorded;

FIG. 2 shows signal rows reproduced from the magnetic tape;

FIG. 3(a) shows a signal (a) input into a reproducing apparatus under eliminating a signal at the edited part;

FIG. 3(b) shows waveform of the signal (a) reproduced;

FIG. 4 is a block diagram of one embodiment of the present invention;

FIGS. 5(a) to (d) show block diagrams for illustrating the operation of the embodiment of FIG. 4;

FIG. 6 is a waveform showing conditions of calibration of the signal by the embodiment of FIG. 4;

FIG. 7 is a block diagram of the other embodiment of the present invention;

DESCRIPTION OF THE PREFERRED EMBODIMENTS

Figures 8A, 8B:
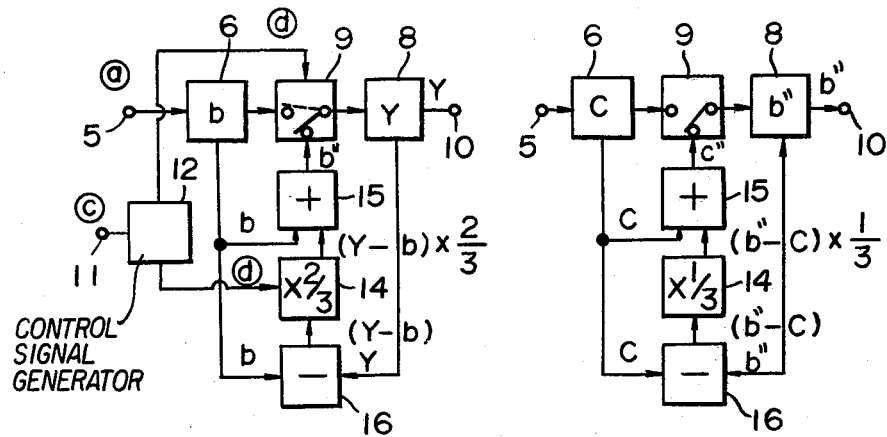
FIGS. 8(a) to (d) are block diagrams for illustrating operation of the embodiment of FIG. 7.

FIG. 4 is a block diagram of one embodiment of the present invention wherein the reference numeral (5) designates an input terminal for a PCM signal row (a); (6) designates a first shift register for memorizing one word of the input PCM signal row (a); (7) designates a second shift register for memorizing n word parts of PCM signal row ⓐ that overflows from the first shift register; (8) designates a third shift register for memorizing one word part of the PCM signal row ⓐ that overflows from the second shift register; (9) designates a switch; (10) designates an output terminal; (11) designates an input terminal for a detecting signal at the edited part (3); (12) designates a control signal generating circuit for receiving the detecting signal ⓒ to thereafter transmit the control signal ⓓ; and the switch (9) is switched as shown by the broken line by control signal ⓓ; (13) designates first weighing means for multiplying a gradually increasing weight from X0 to X1 to the data of words outputted sequentially from the first shift register (6) upon receiving the control signal ⓓ to convert this data into an output PCM signal e; (14) designates second weighing means for multiplying a gradually decreasing weight from X1 to X0 to the data of words outputted from the third shift register (8) upon receiving the control signal ⓓ to convert this data into an output PCM signal ⓕ; (15) designates an adder for converting to the PCM signal ⓖ the summed PCM signals ⓔ, ⓕ.

The number n of words memorized in the second shift register (7) is preferably in a range of 10 to 100.

In the following description, the operation of the embodiment will be illustrated in the case of n=3.

FIGS. 5(a) to (d) show conditions of the parts in each of the steps.

FIG. 6 shows the reproduced waveform of the calibrated PCM signal (g).

In the embodiment of FIG. 4, the switch (9) is closed as shown by the full line in the original condition; the PCM signal ⓑ which delays for 1+3+1=5 words from the input signal ⓐ is sequentially outputted from the output terminal (10).

If the control signal ⓓ is inputted when the PCM signals ⓑ, YXW and V are respectively memorized in the first, second and third shift registers (6), (7), (8) as shown in FIG. 5(a), the switch (9) is switched as shown by the full line. At this time, the coefficient of the first weighing means (13) is set to X0 and the coefficient of the second weighing means (14) is set to X1 whereby the PCM signal having the value of $VX1+bX0=V$ is outputted from the adder (15) and the signal is outputted from the output terminal (10).

Thus, when the one word is processed, it is switched and the coefficient of the first weighing means (13) is changed from X0 to $X_3^1$ and the coefficient of the second weighing means (14) is changed from X1 to $X_3^2$, as shown in FIG. 5(b). They are inputted into the adder (15) as the PCM signals having respectively $C X_3^1 = C'$ and $W X_3^2 = W'$ whereby the PCM signal ⓖ $W' + C'$ is outputted from the adder (15).

As shown in FIG. 5(c), the coefficient of the first weighing means (13) is changed from $X_3^1$ to $X_3^2$ and the coefficient of the second weighing means (14) is changed from $X_3^2$ to $X_3^1$. In the same manner, the PCM signal ⓖ having the calibrated value $(X'+d')$ is outputted.

As shown in FIG. 5(d), the coefficient of the first weighing means (13) is changed from $X_3^2$ to X1 and the coefficient of the second weighing means (14) is changed from $X_3^1$ to X0. In the same manner, the PCM signal having the value e is outputted and this condition is maintained.

As the result of a calibration, the voice signal given by decoding the PCM signal row ⓖ output from the output terminal (10) has the waveform shown by the dotted chain line of FIG. 6 whereby the discontinued part shown in FIG. 3(b) is eliminated.

In said embodiment, the number n of the memorizing part memorized by the second shift register (7) is 3. Thus, the number n is usually in a range of about 10 to 100, whereby the calibrating curve is further smoothed.

In this embodiment of the present invention, when one of the edited parts is detected, the condition is shifted to the condition of FIG. 5(d) and the condition is continued. When a magnetic tape having two or more edited parts is reproduced, suitable calibrations are not performed. The following feature can be considered. In order to reproduce the magnetic tape having two or more edited parts, the two devices having the structure of FIG. 4 are disposed in parallel. When one device starts the operation to transmit the control signal, after the condition of FIG. 5(d), it is switched to the second calibrating means whereas the first calibrating means is returned to the original condition or the waiting condition.

FIG. 7 shows the other embodiment of the present invention which can calibrate magnetic tape having a plurality of edited parts.

In FIG. 7, the reference numeral (16) designates a subtractor and the other parts designated by the same numeral references of FIG. 4 are identical or corresponding parts having corresponding functions.

FIGS. 8(a)–(d) are block diagrams for illustrating the function of the embodiment of FIG. 7 and are operated as follows. The shift registers (6) and (8) respectively, memorize signals for each one word and the weighing means (14) receives the control signal ⓓ to multiply a gradually decreasing weight from "1" to "0". When the data memorized in the shift registers (8) and (6) are respectively Y and b as shown in FIG. 8(a), and the edited part detecting signal ⓒ is inputted into the control signal generating circuit (12) to transmit the control signal ⓓ, the switch (9) is switched to the position shown by the full line. On the other hand, the control signal ⓓ is inputted into the weighing means (14) and the coefficient of the weighing means is gradually decreased for each one word. When it is calibrated for signals in n numbers of the recording parts, the coefficient of the weighing means gives X0. The number n of the recording parts for calibration is usually in a range of 10 to 100. However, in FIG. 8, the number n is 3 because it simplifies the description. FIGS. 8(a)–(d) show the conditions for shifting the data of the shift registers (6) and (8) for each one word.

In FIG. 8(a), when the switch (9) is switched, the datum Y of the shift register (8) is transmitted from the output terminal (10) and simultaneously inputs into the subtractor (16). On the other hand, the datum b of the shift register (6) is input into the subtractor (16) and the differential signal (Y−b) is inputted into the weighing means (14). The coefficient of the weighing means (14) is switched from X1 to $X_3^2$ and the PCM signal of $(Y-b)X_3^2$ is input into the adder (15). On the other hand, the signal b from the shift register (6) inputs the adder (15), whereby the output of the adder (15) is the PCM signal of $b+(Y-b)X_3^2 = b''$ and the output is passed through the switch (9) and is memorized in the shift register (8) behind the signal Y.

When signals such as the data of the shift register (6) are overflowed and the next signal c is memorized, the coefficient of the weighing means (14) is changed from $X_3^2$ to $X_3^1$ as shown in FIG. 8(b).

In the same manner, the signal b'' is output from the output terminal (10) and successively, the signal of $c+(b''+c'')X_3^1 = c''$ is memorized in the shift register (8).

Figures 8C, 8D:
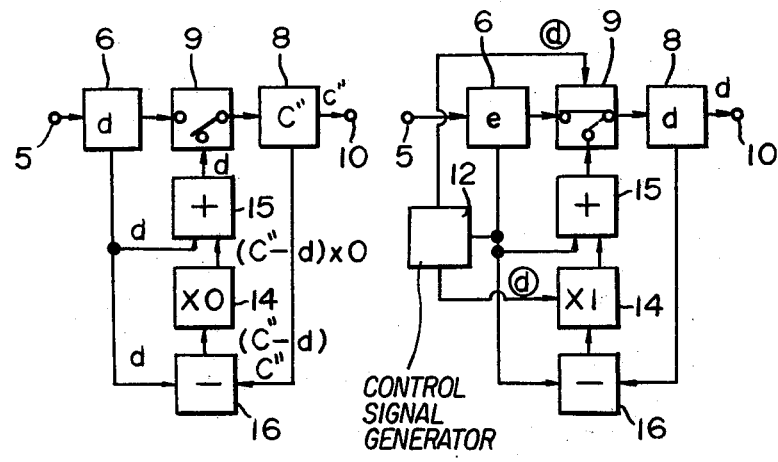

When the signal c as the datum of the shift register (6) is overflowed, the coefficient of the weighing means (14) is changed to X0 as shown in FIG. 8(c), whereby the signal c'' is outputted from the output terminal (10).

When the signal (d) is overflowed from the shift register (6), the control signal ⓓ is transmitted from the control signal generating circuit (12) whereby the switch (9) is switched to the position shown by the full line in FIG. 8(d) and the coefficient of the weighing means (14) is changed from X0 to X1 and the apparatus is returned to the original state (waiting condition). Therefore, when a new edited part detecting signal ⓒ is inputted, the calibration of the signal waveform is performed again.

Figure 9:
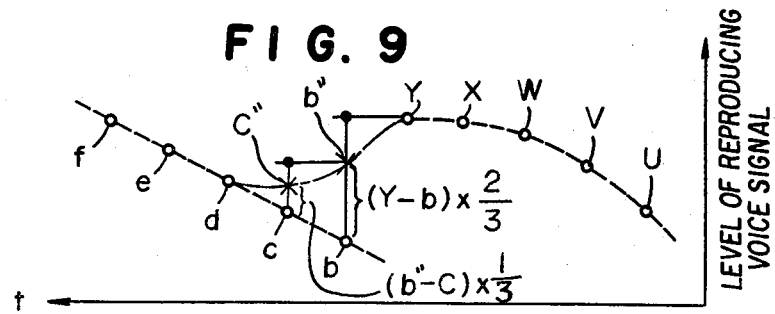
FIG. 9 is a waveform showing conditions of calibration of the signal by the embodiment of FIG. 7.

FIG. 9 shows the waveform of the reproducing signal in the calibration of the waveform described referring to FIGS. 8(a)–(d). The part shown by the dotted chain line is the calibrated part.

In accordance with the embodiment of the present invention, the calibration of the waveform of the magnetic tape having plural edited parts can be performed without connecting calibrating means in parallel.

In said embodiments, the shift register (8) has the structure for memorizing the PCM signal for one word. However, it is not limited to one word and it can be used for plural words and the same coefficient can be multiplied for plural words.

In said embodiments, the shift registers are used as the memorizing means. Thus, it is not limited to use the shift registers.

The apparatus of the present invention comprises weighing means which is operated by the edited part detecting signal to multiply a gradually decreasing weight from X1 to X0 for the level of the signal front of the edited part when a discontinuance of the reproduced sound at the edited part is found in the reproduction of the magnetic recording of the PCM signals; means for summing the signals having been weighed whereby the digital signals are treated to shifted gradually from the level of the signal in front of the edited part to the level of the signal behind the edited part and the discontinuance sound of the reproduction at the edited part can be remarkably reduced.

What is claimed is:

1. An apparatus for reproducing a PCM magnetic recording tape, comprising:
   a detecting means for detecting an edited part from PCM signal rows reproduced from said magnetic recording tape;
   a delay means for delaying said PCM signal rows in sequence during a specific time;
   a first weighing means for weighing to gradually increase the backward signal recorded behind said edited point under the control of a signal detected by the detecting means;
   a second weighing means under the control of said signal from said detecting means for weighing the output from said delay means to gradually decrease the forward signal recorded in front of said edited point;
   an adder for summing output signals from said first weighing means and said second weighing means;
   a switch under the control of said signal from said detecting means for switching to obtain a reproduced output from said adder during a specific term and to reproduce and to output the output of said delay means during the other term.

2. An apparatus for reproducing a PCM magnetic recording tape according to claim 1 wherein the weighing of the first weighing means gradually increases as a desired value between X0 and X1.

3. An apparatus for reproducing a PCM magnetic recording tape according to claim 1 wherein the weighing of the second weighing means gradually decreases as a desired value between X1 and X0.

4. An apparatus for reproducing a PCM magnetic recording tape according to claim 1 wherein said delay means is formed by a shift resister for memorizing a plurality of PCM signal rows.

5. Apparatus for reproducing voice signals from a PCM magnetic recording tape in which a coded voice signal is recorded further including a discontinue waveform calibrator which comprises: a control signal generator for detecting an edited part from PCM signal rows reproduced from the magnetic tape and for transmitting a control signal; a first memorizing means for memorizing at least one word part of the PCM signal rows which are inputted sequentially; a second memorizing means for memorizing specific words of the PCM signal rows overflowed from the first memorizing means; a third memorizing means for memorizing at least one word part of the PCM signal rows overflowed from the memorizing means; a first weighing means for multiplying a gradually increasing weight from X0 to X1 to the memorized data of the first memorizing means upon receiving said control signal to output it; a second weighing means for multiplying a gradually decreasing weight from X1 to X0 to the memorized data of the third memorizing means upon receiving said control signal; an adder for summing gradually the output signals of the first and second weighing means; and a switch for switching to receive as an input the PCM signal overflowed from the third memorizing means in the normal state and switching the PCM signal output from the adder into a decoder upon receiving said control signal.

6. Apparatus for reproducing voice signals from a PCM magnetic recording tape in which a coded voice signal is recorded further including a discontinue waveform calibrator which comprises: a control signal generator for detecting an edited part from PCM signal rows reproduced from the magnetic tape and for transmitting a control signal; a first memorizing means for memorizing at least one word part of the PCM signal rows which are inputted sequentially; a second memorizing means for memorizing at least one word part of the PCM signal rows which are inputted sequentially;
   a subtractor for subtracting data of the second memorizing means from the data of the first memorizing means; weighing means for multiplying a gradually decreasing weight from X1 to X0 for specific words to the output of the subtractor upon receiving said control signal; an adder for summing the output of the weighing means and the output of the first memorizing means; and a switch for switching the output of the first memorizing means into the second memorizing means in the normal state, and for switching the output of the adder into the second memorizing means during receipt of said control signal for passing the specific words, whereby the PCM signal rows overflowed from the second memorizing means are decoded.

* * * * *